Figure 1:
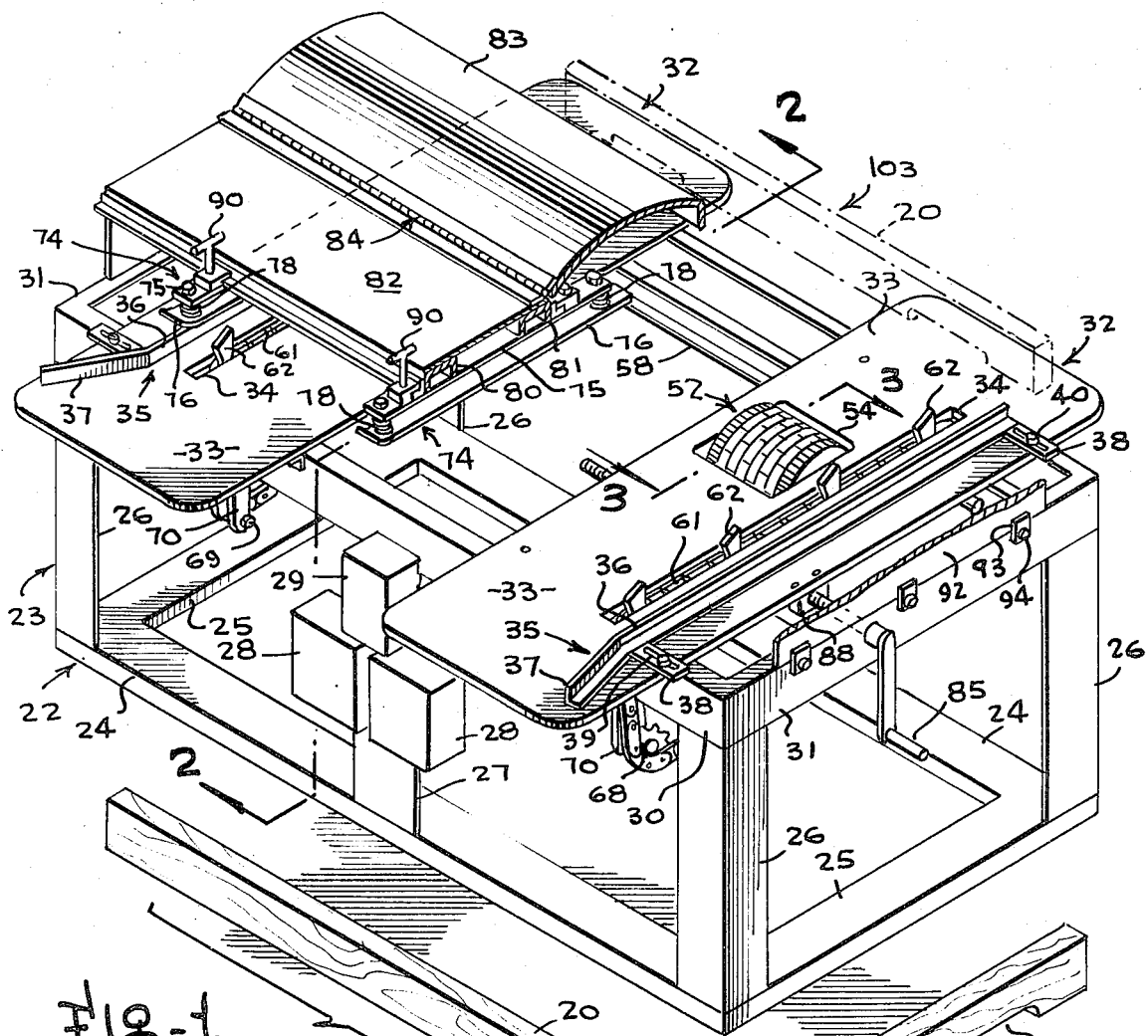

United States Patent
Wells

[15] 3,664,394
[45] May 23, 1972

[54] DOUBLE HEAD NOTCHING MACHINE

[72] Inventor: Sylvan O. Wells, Springfield, Mo.

[73] Assignee: Kenwal Machine Company, Inc., East Harrison, Republic, Mo.

[22] Filed: Nov. 14, 1969

[21] Appl. No.: 876,795

[52] U.S. Cl. .................................144/133 R, 144/252
[51] Int. Cl. .................................................B27c 5/06
[58] Field of Search ......................144/133, 136, 252, 2

[56] References Cited

UNITED STATES PATENTS

| | | |
|---|---|---|
| 1,141,887 | 6/1915 | Purdy et al..........................144/133 A |
| 2,907,359 | 10/1959 | Lade....................................144/136 R |
| 2,630,846 | 3/1953 | Ballantine............................144/252 |
| 1,881,400 | 10/1932 | Edmond............................144/133 X |

*Primary Examiner*—Donald R. Schran
*Attorney*—Sherman Levy

[57] ABSTRACT

A double head notching machine for pallet stringers wherein there is provided a pair of cutting heads, a crank adjustment, spring loaded hold down mechanisms, and a feed mechanism.

3 Claims, 5 Drawing Figures

PATENTED MAY 23 1972 3,664,394

SHEET 1 OF 4

INVENTOR.
SYLVAN O. WELLS
BY
Sherman Levy
ATTORNEY

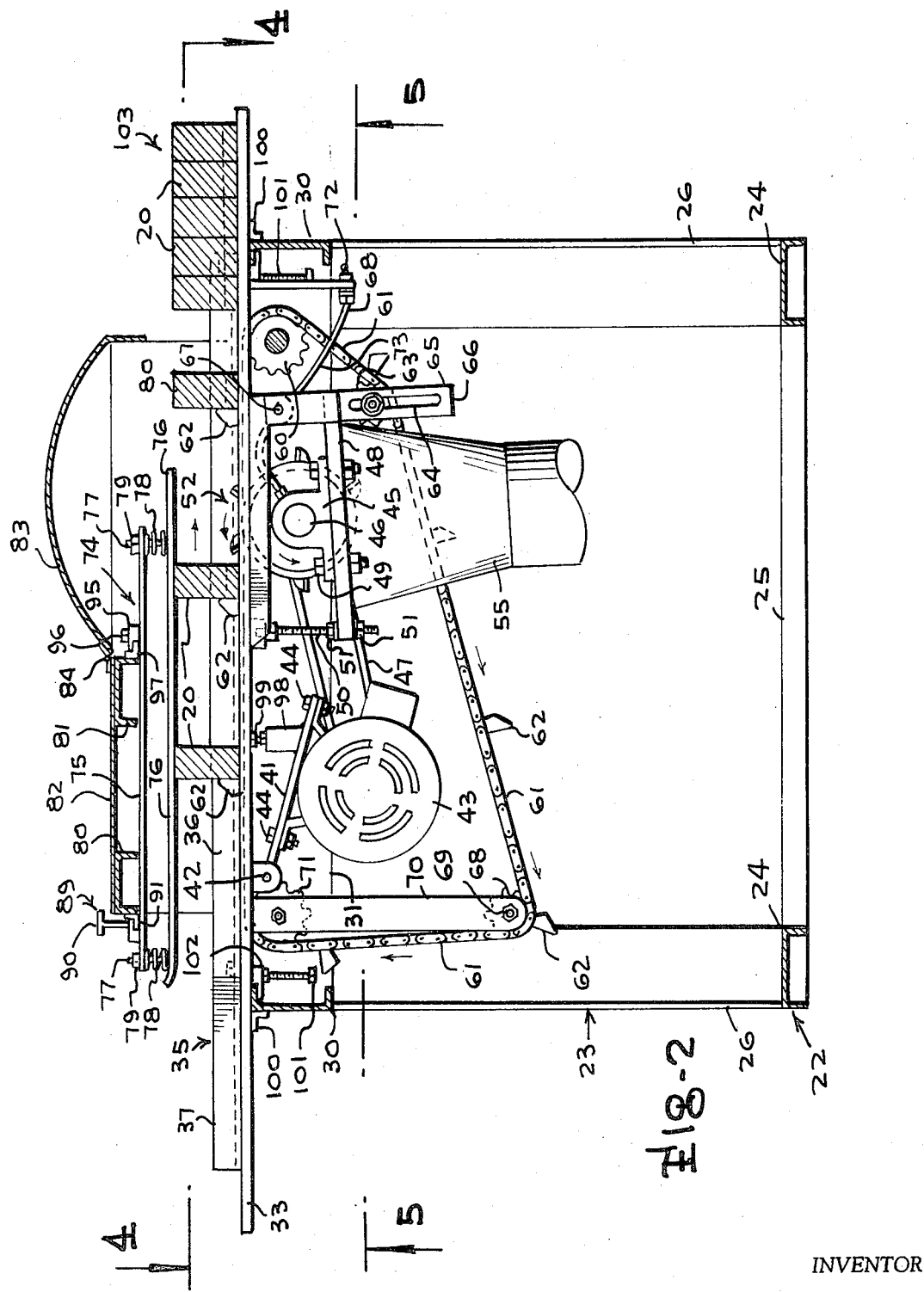

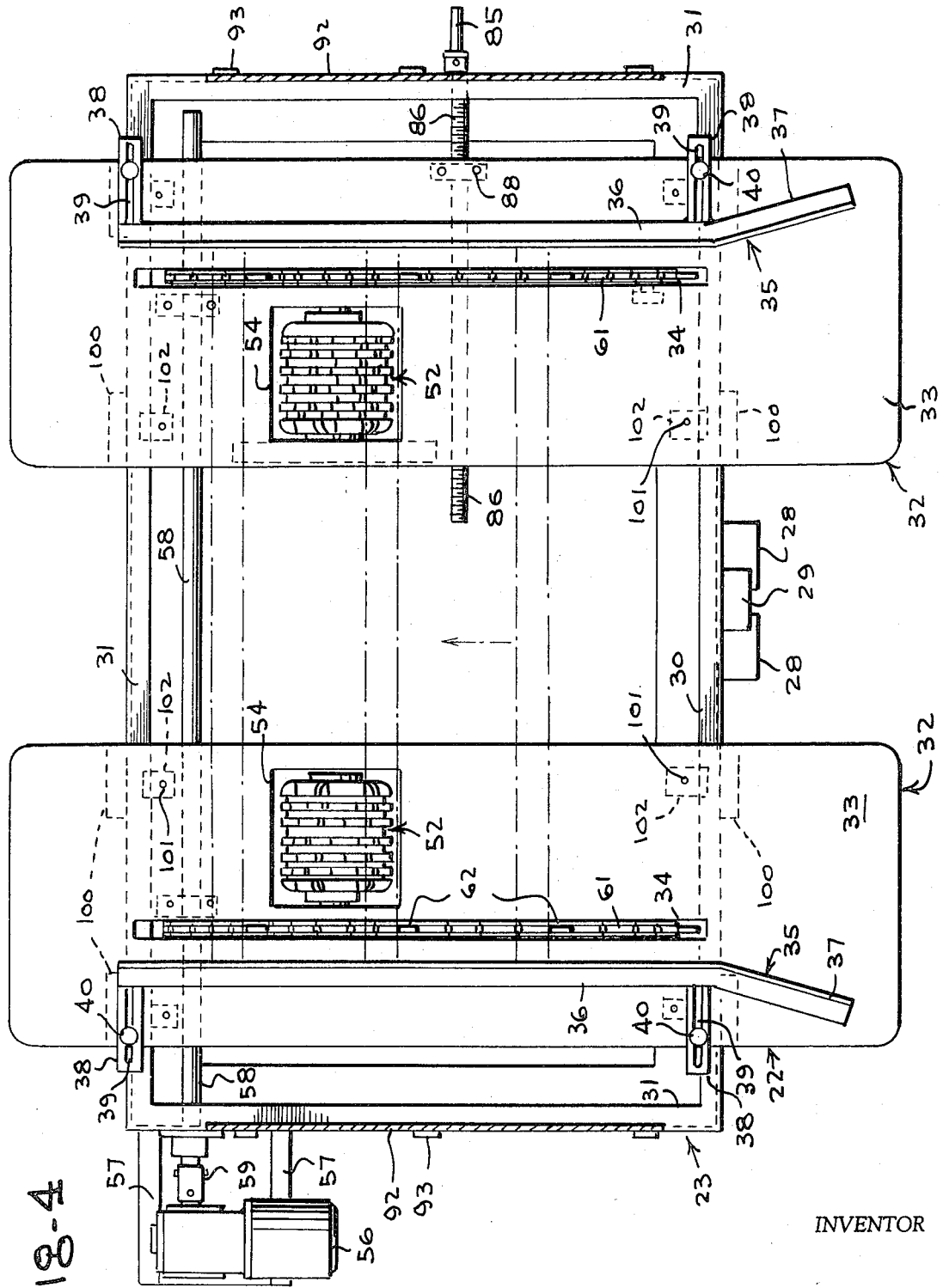

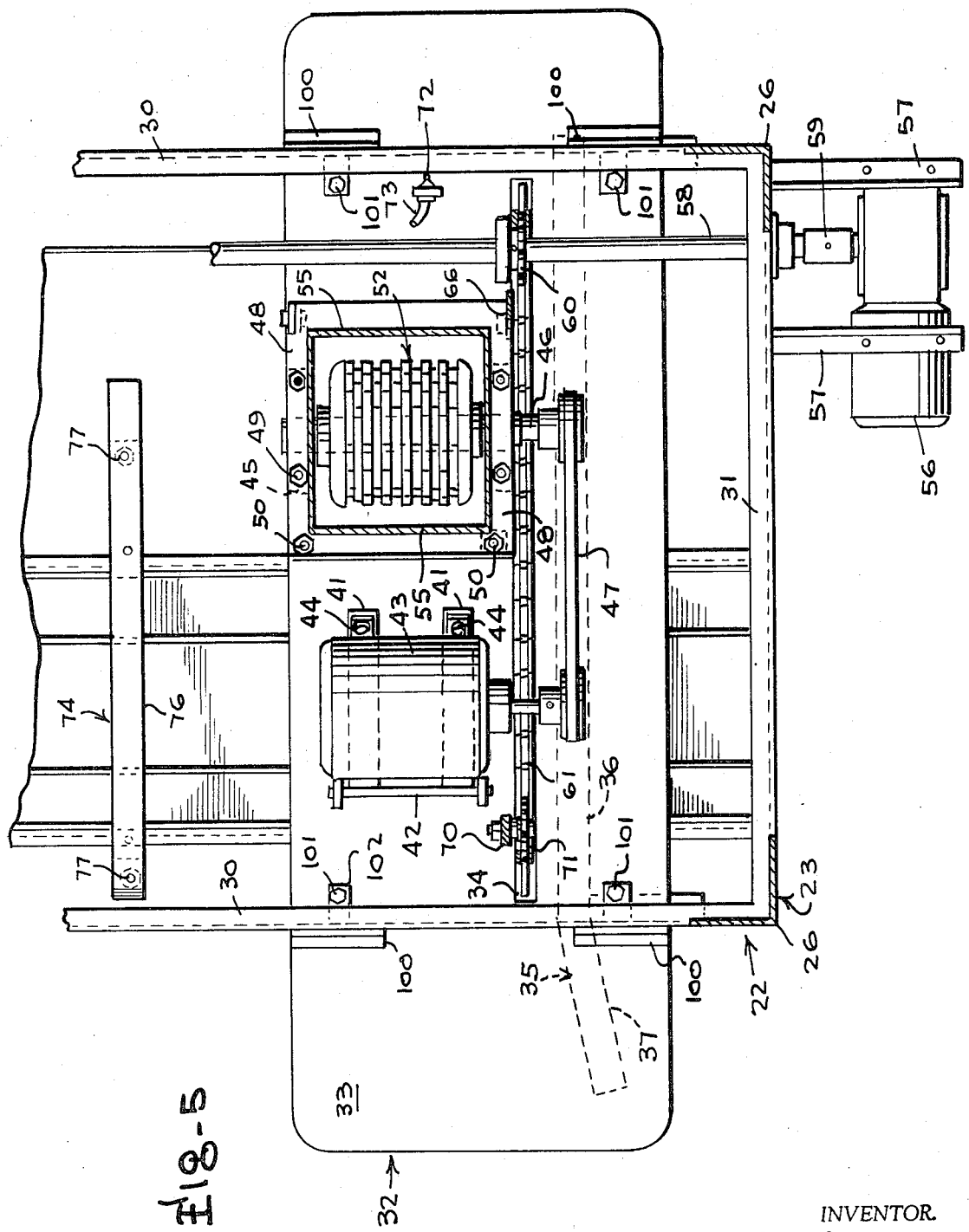

DOUBLE HEAD NOTCHING MACHINE

The invention relates to a notching machine for pallet stringers, and more particularly to a notching machine that is constructed so that a pair of spaced apart notches are cut at one pass.

An object of the present invention is to provide a double head notching machine that has a straight through feed, and wherein the operator merely places the stringers on the table so that they are picked up by the feed lugs, carried over the heads, finished, and discharged at the other end.

A further object is to provide a double head notching machine which will produce a large number of finished stringers in a short period of time, and wherein with the present invention only the feed chain is moved mechanically in only one continuous direction, the present invention being characterized by having a minimum number of moving parts, longer life, longer care free operation, lower maintenance cost, and less down time.

A still further object of the present invention is to provide a double head notching machine that includes a pair of cutting heads that are each powered separately, and wherein there is provided a crank adjustment that quickly positions the table and head unit for various lengths of stringers from 30 inches to 72 inches, the present invention also permitting the location and spacing of the notches to be easily and quickly changed.

A still further object of the present invention is to provide a machine of the character described that readily handles any board width from 2½ inches to 4½ inches, and wherein there is provided spring loaded hold downs that prevent boards from tipping, as well as preventing kick back, and wherein special heads can be used for different types of notches. In addition, there is provided a feed mechanism that permits steady flow of work, and there is also provided an automatic feed cut-off if the motor should fail on either head, and wherein the device is entirely mechanical and does not use air or hydraulics.

Still another object is to provide a double head notching machine that is rugged in structure and fool-proof in use, and which is economical to manufacture and efficient in operation.

These and other object of the invention will become apparent from a reading of the following specification and claims, together with the accompanying drawing, wherein like parts are referred to and indicated by like reference characters, and wherein:

FIG. 1 is a perspective view of the double head notching machine of the present invention, with parts broken away and in section, for clarity of illustration.

Figure 3:
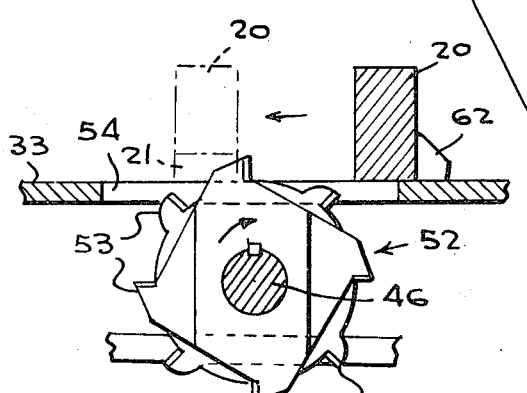

FIG. 2 is a sectional view, taken on the line 2—2 of FIG. 1.
FIG. 3 is a sectional view, taken on the line 3—3 of FIG. 1.
FIG. 4 is a sectional view taken on the line 4—4 of FIG. 2.
FIG. 5 is a sectional view taken on the line 5—5 of FIG. 2.

Referring in detail to the drawings, the numeral 20 indicates a stringer adapted to have a pair of spaced apart notches 21 formed therein by the double head notching machine 22 of the present invention. The machine 22 includes a frame 23 that embodies horizontally disposed bottom members 24 and 25, as well as upstanding vertically disposed spaced apart parallel legs 26 that have their lower ends suitably secured to and formed integral with the bottom members 24 and 25. The frame 23 further includes horizontally disposed top members 30 and 31 that are suitably affixed to the upper ends of the legs 26 and 27. Control units 28 and 29 of conventional struction are arranged contiguous to the upstanding leg 27 and are operatively connected thereto, for a purpose to be later described.

The machine 22 includes a pair of similar notching mechanisms 32 that each embody a horizontally disposed table 33, and each table 33 has a slot or cut away portion 34 therein, FIG. 1.

The numerals 35 indicate guide members that each comprise main straight portions 36 as well as angularly arranged portions 37, and straps or bars 38 are suitably affixed to the guide members 35. The straps 38 have slots 39 therein through which extend securing elements such as the bolts 40.

Arranged below the tables 33 are bracket members or support members 41 that are pivotally supported as at 42, and a motor 43 is connected to each support member 41, as at 44, FIG. 2. The numeral 45 indicates pillow blocks that are connected to support pieces 48 as at 49, FIG. 2, and shafts 46 are journalled in the pillow blocks 45. An endless belt 47 serves to operatively connect the motor 43 to the shaft 46. Screw members or bolts 50 are operatively connected to an adjustable support 48 for the pillow blocks 45, and fasteners such as nuts 51 are arranged in threaded engagement with bolts 50.

The numeral 52 indicates a cutting head that is keyed or otherwise connected to the shaft 46, FIG. 3, and the cutting head 52 includes a plurality of cutting tips 53 that are adapted to move or travel through a slot or recess 54 in the table 33 to form the notches 21 in the stringers 20. A suction unit 55 of conventional construction is adapted to be arranged below the cutting head 52, and the suction unit 55 can be provided with vacuum pressure from a suitable conventional mechanism, whereby sawdust and the like will be conveniently carried away from the machine of the present invention.

The numeral 56 indicates a motor that is supported adjacent one end of the machine 22 by means of support pieces 57, FIG. 4, and a drive shaft 58 is driven from the motor 52 through the medium of a unit 59. Sprockets 60 are mounted on the shaft 58 and arranged in engagement with the sprockets 60 are endless chains 61 that have feed lugs 62 suitably affixed thereto. The feed lugs 62 are adapted to move through the slots 34 in the tables 33 as shown in FIG. 1, so as to move the stringers 20 through the machine in order to cause the cutting heads 52 to form the notches 21 in the stringers 20. The sprocket members 63 also engage the chains 61 and the sprocket members 63 are mounted on the shaft 64 which extend through slots 65 in arms 66, and the upper portions of the arms 66 may be pivotally mounted as at 67. There is also provided sprockets 68 that have the chains 61 arranged in engagement therewith, and the sprockets 68 are supported as at 69 on the lower ends of arms or bars 70. Sprockets 71 are arranged as shown in the drawings for engagement by the chains 61 to help guide the chains during their travel. The numeral 72 indicates grease fittings of conventional construction that have hoses or conduits 73 connected thereto whereby grease or other suitable lubricant can be supplied to the pillow blocks 45 and associated parts. The numeral 74 indicates hold down mechanisms that include spaced apart horizontally disposed upper and lower bars 75 and 76 and securing elements or bolts 77 extend therebetween, and spring members 78 are circumposed on the bolts between the bars 75 and 76, there being fasteners or nuts 79 arranged in threaded engagement with the upper ends of the bolts 77.

Channel members or beams 80 and 81 have a horizontally disposed shield 82 suitably affixed thereto, FIG. 2, and the numeral 83 indicates a cover that has a generally arcuate formation, and the cover 83 is hingedly connected to the shield 82 as at 84. The numeral 85 indicates a manually operable adjustable crank.

The manually operable crank 85 includes a threaded screw portion or shaft 86 that is arranged in threaded engagement with a lug 87 that is secured to one of the tables 33. Thus, by manually rotating the crank 85, the table 33 that is attached to the lug 87 can be accurately adjusted towards and away from the other table 33 and this permits fine adjustment to be made so that stringers 20 of different sizes can be readily accommodated and handled in the machine.

The numeral 89 indicates locking devices that include adjustable bolts or elements 90 that are adapted to coact with strips 91 for maintaining the parts in their proper assembled relation adjacent the channel members 80. Side plates 92 are adapted to have straps or lugs 93 secured thereto as by welding, and the straps 93 may be secured as at 94 to the frame pieces 31, FIG. 1. Locking elements 96 are adapted to extend through retainers 95 that coact with bars or angle members 97 to help maintain the parts in their proper aligned relationship.

The motor 43 may have a stop member 98 operatively connected thereto for limiting upward movement of the motor 43 about an axis extending through the pivot 42, and the stop member 98 is provided with an adjustable element 99 thereon so that the amount of adjustment may be varied as desired or required.

The numeral 100 indicates retainers or bars that are suitably affixed below the tables 33 adjacent one side of the upper frame pieces 30. Adjustable screw members 101 extend through the locking members 102 on the opposite sides of the channels 30 so as to maintain the tables in their proper position.

From the foregoing, it will be seen that there has been provided a double head notching machine which is indicated generally by the numeral 22, and the machine 22 includes the frame 23 that has the pair of generally similar notching mechanisms 32 thereon. Each notching mechanism 32 has generally the same construction and each comprises a horizontally disposed table or top 33 that has a recess 54 therein through which extends a portion of a cutting head 52. When using the machine of the present invention, it is only necessary for a person to stand in front of the machine and feed stringers such as the stringers 20 onto the front projecting end portions of the tables 33 whereby with the motors 43 and 56 actuated, it will be seen that the pair of spaced apart notches 21 will be automatically formed in the wooden stringers 20. Such notched stringers can then be used for any desired purpose, such as for making pallets.

It is to be noted that as the stringers 20 are fed into the front of the machine, the chains 61 are rotating whereby they will cause the feed lugs 62 to move in a clockwise direction, FIG. 2, so that these feed lugs 62 will push or move the stringers 20 through the table and into engagement with the pair of rotating cutting heads 52 whereby the notches 21 will be formed in the stringers. The finished stringers with the pair of notches 21 therein will end up at the rear of the machine at a position indicated by the numeral 103 whereby these stringers can then be conveniently removed and used in the desired manner.

The double head notching machine of the present invention is adapted to be used for making notches in pallet stringers, as previously stated. The members 35 act as guides for the stringers moving through the machine and the members 35 can be adjusted towards or away from each other by loosening the securing elements 40 and then shifting the members 35 to the desired position, and then the elements 40 can be tightened to maintain the parts in their desired location. The cutting heads 52 are adapted to be arranged rearwardly of suitable flaps.

The parts can be made of any suitable material and in different shapes or sizes as desired or required.

The double head notching machine of the present invention includes cutting heads 52 that may be of the dado type that are provided with carbide cutting tips 53, and each of the heads 52 are powered separately. The crank adjustment 85 quickly positions the table and head unit for various lengths of stringers from 30 to 72 inches. The location and spacing of the notches can be easily and quickly changed. Also the machine readily handles any board width from 2½ inches to 4½ inches. The three spring rotated hold down mechanisms 74 prevent board tipping and kickback. Special heads may be used for a variety of notches.

The feed mechanism is constructed and designed to permit steady flow of work and it will accommodate up to 1,200 stringers per hour if kept loaded. In addition, there is an automatic feed cut-off if motor should fail on either head. A strapping notch may be provided as an optional attachment and does not interfere with the regular notching operation. The machine is simple and is all mechanical and does not use air or hydraulics, and it is rugged, all steel construction. In addition, the tables are reversible. When using the machine of the present invention 2-inch by 4-inch or other sizes of stringers 20 are placed on edge on the feed end of the tables 33, FIGS. 1 and 2. They are picked up by the feed lugs 62 and carried through the cutting heads 52 immediately behind the guard flaps that are arranged about midway of the tables, and then the stringers are carried on off the back end of the tables. The only manual effort required of the operator after the machine is set for a certain specification is to place the stringers on the table to be picked up by the feed lugs. The guides funnel the stringers into the proper aligned position.

Some of the advantages or important aspects of the present invention are as follows:

The crank 85 permits adjustment of the table for various length stringers, and this is to be compared with other machines that require considerable time and effort to be changed. The guides 35 are quickly adjustable so that notches can be placed anywhere on the stringers that differing specifications might indicate. While there has been a previous mention of handling of any width board from 2½ inches to 4½ inches, the hold-downs are actually adjustable down to one-half inch or less. With the hold-downs 74 properly adjustable to the width of the board being run, the stringer canot be tipped over and kicked back toward the operator.

In addition, a strapping notch attachment can be used in conjunction with the notching machine, and such strap notcher can be used at the same time the regular notcher is used, that is, both top and bottom stringers can be notched at one pass rather than requiring two separate operations and double the time. Further, either operation can be done independently. If the strapping notcher is not being used on a particular specification, it is merely raised out of the way with no disassembly required.

In addition, since tables, heads, motors and drives are all one unit, the tables are reversible for end-notching operations and other specialized jobs that are not expected of regular notching machines. Furthermore, the machine of the present invention has two heads 52 so that both notches are cut at one pass, and this is to be contrasted with previous U.S. Pat. No. 3,470,924 which only cuts one notch at a time. The present invention has a straight through feed so that the operator merely places the stringers on the table, they are picked up by the feed lugs, carried over the heads, finished and discharged at the other end. On the machine of the present invention the heads and table remain stationary during the entire operation, and only the feed chains move. The notcher of the present invention will produce a large number of finisher stringers per hour, and only a minimum number of steps are necessary: The operator places the stringers on the table and they pass straight through and are discharged.

In addition, the present invention has an all mechanical mechanism, and this is to be contrasted to hydraulic devices such as shown in prior U.S. Pat. No. 3,470,924. Thus, in the present invention only the feed chain moves and in only one continuous direction, whereas in prior U.S. Pat. No. 3,470,924 the table is moved four times and the head is moved to two different positions, and this is all done with hydraulic cylinders. If the machine of the present invention has a failure, the fault be obvious to anyone, and the repairs can be made readily and easily, usually on the spot. Hydraulics are well known for the close tolerances required, and specialists qualified to work on them are not available to most pallet mills. Thus, the mechanical machine has the advantages of fewer moving parts, longer life, longer carefree operation, lower maintenance cost and less down-time.

Although the invention has been herein shown and most described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

I claim:

1. In a double head notching machine for forming notches in pallet stringers, a frame embodying horizontally disposed bottom members, vertically disposed legs and horizontally disposed top members, control units operatively connected to said frame; a pair of horizontally disposed tables mounted on said frame and each table having a recess and slot therein, guide members positioned contiguous to the upper portion of said tables, and each guide member including a main straight portion and an angularly arranged portion, securing elements maintaining said guide members stationary in their adjusted positions, pivotally mounted bracket members arranged below said tables, a motor mounted below each table on said bracket member, pillow blocks connected to said bracket members and said pillow blocks having shafts journalled therein, cutting heads mounted on said shafts, drive means including an endless belt connected to said shafts, adjustable screw members for said motors, said cutting heads having a plurality of tips for movement through the recesses in the tables; a motor mounted adjacent one end of the frame, a suction unit arranged adjacent the cutting heads, a drive shaft operatively connecyed to said last-named motor, a pair of sprockets on said drive shaft, a pair of endless chains engaging said sprockets on said drive shaft, spaced apart feed lugs connected to said chains, said feed lugs adapted to move through the slots in the table, a plurality of spaced apart spring loaded hold-down mechanisms each including spaced apart upper and lower bars, channel members above said hold-down mechanisms, a horizontally disposed shield secured to said channel members, an arcuate cover hingedly connected to said shield, a lug secured to said table, and a manually operable crank having a portion connected to said last-named lug for adjusting the movement of the tables whereby one of said tables can be moved towards and away from the other of said tables with a fine adjustment.

2. The structure as defined in claim 1, and further including locking devices for maintaining the parts in their proper assembled relation adjacent the channel members.

3. The structure as defined in claim 2, and further including retainers affixed to tables adjacent one side of the frame.

* * * * *